Oct. 3, 1939.   H. J. McC. BURDICK   2,174,964
VALVE MECHANISM
Filed April 19, 1937   2 Sheets-Sheet 1
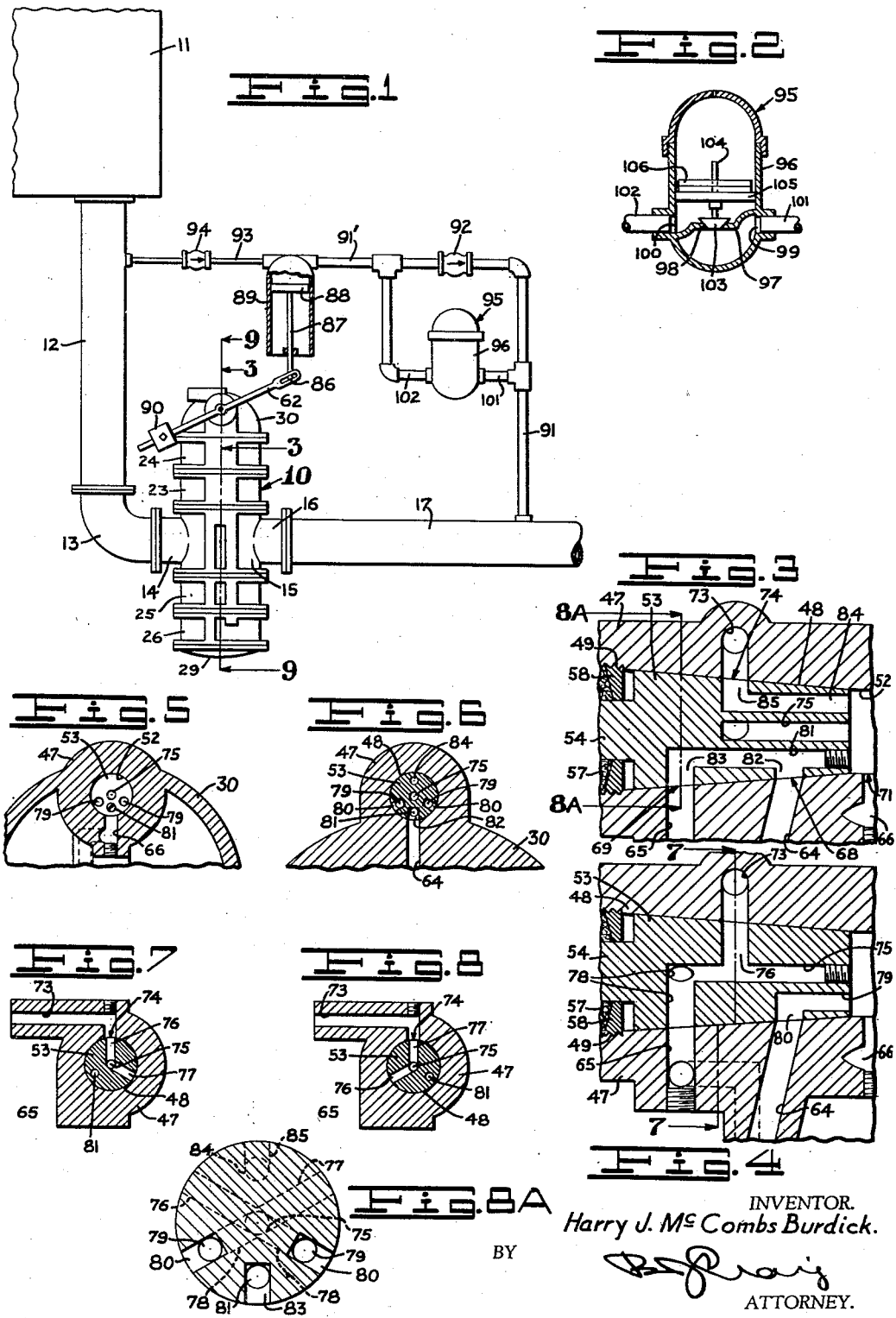
INVENTOR.
Harry J. McCombs Burdick.
BY
ATTORNEY.

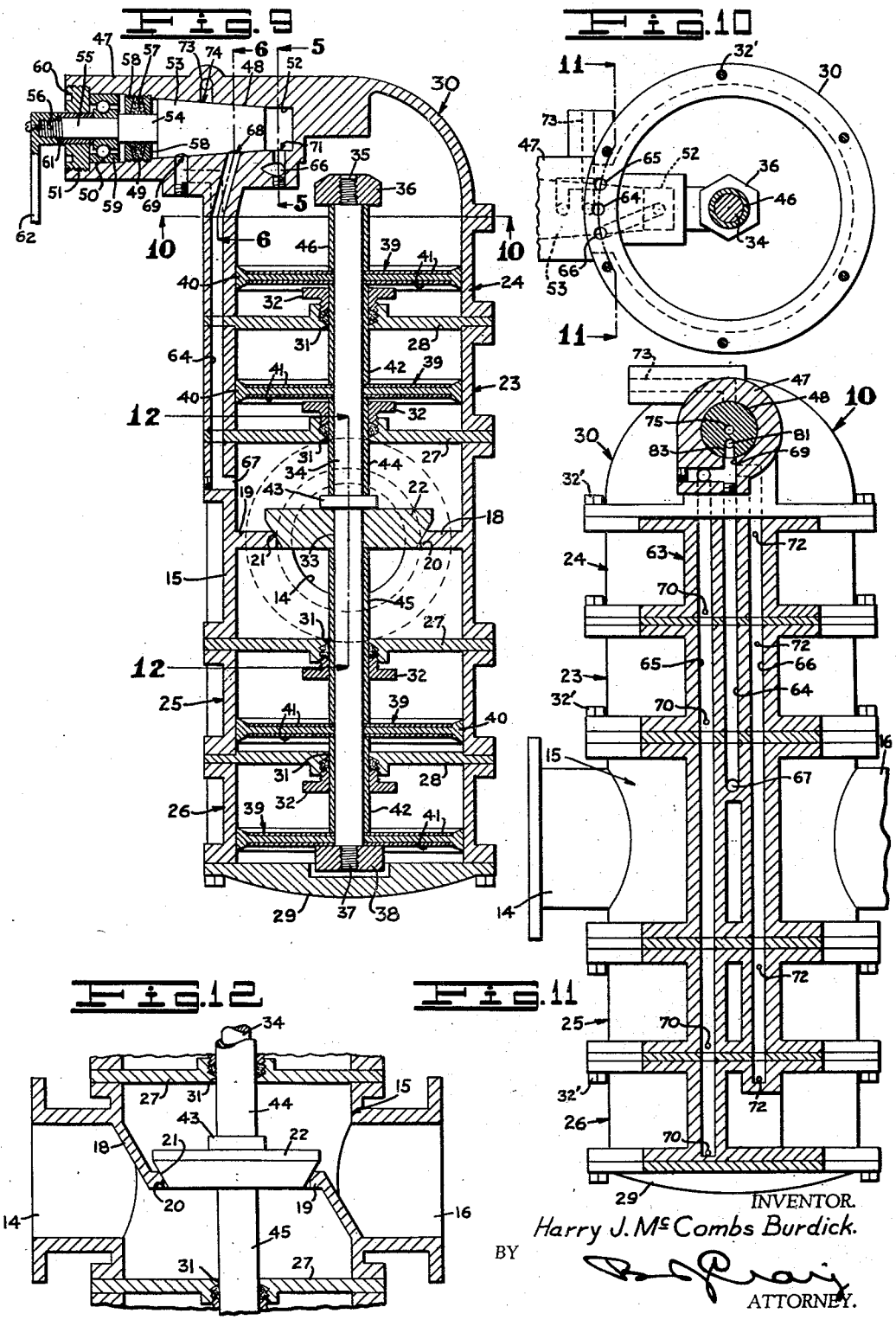

Patented Oct. 3, 1939

2,174,964

UNITED STATES PATENT OFFICE 2,174,964

VALVE MECHANISM

Harry J. McCombs Burdick, Anaheim, Calif.

Application April 19, 1937, Serial No. 137,700

5 Claims. (Cl. 137—139)

This invention relates to automatic valve construction.

The general object of the invention is to provide an improved valve.

A more specific object of the invention is to provide a novel valve operated by a novel construction of multiple cylinders.

Another object of the invention is to provide an improved means for actuating a multiple cylinder valve.

Another object of the invention is to provide a novel apparatus for controlling the flow of fluid to and from a tank.

An additional object of the invention is to provide a novel plug valve means for operating fluid actuated devices.

An additional object of the invention is to provide a novel foot valve.

Another object of the invention is to provide a novel hydraulc means for operating valves.

Other objects and the advantages of my invention will be apparent from the following description taken in connection with the accompanying drawings, wherein:

Fig. 1 is a fragmentary side elevation partly in section showing one installation of my valve equipment;

Fig. 2 is a section of the automatic valve;

Fig. 3 is a section taken on line 3—3 Fig. 1 showing the valve in open position;

Fig. 4 is a view similar to Fig. 1 showing the valve in closed position;

Fig. 5 is a fragmentary section taken on line 5—5 of Fig. 9;

Fig. 6 is a fragmentary section taken on line 6—6 of Fig. 9;

Fig. 7 is a fragmentary section taken on line 7—7 of Fig. 4;

Fig. 8 is a view similar to Fig. 7 showing the plug valve in a different position;

Fig. 8A is a section taken on line 8A—8A of Fig. 3;

Fig. 9 is a section taken on line 9—9 Fig. 1;

Fig. 10 is a sectional view of the cap member taken on line 10—10 Fig. 9;

Fig. 11 is a section taken on line 11—11 Fig. 10; and

Fig. 12 is a fragmentary central sectional view taken on line 12—12 Fig. 9.

Referring to the drawings by reference characters I have shown my invention as embodied in a valve mechanism which is indicated generally at 10. As shown the valve mechanism is shown in connection with a tank 11 from which a pipe 12 extends to an elbow 13 which is connected to an outlet member 14 on the central portion 15 of a valve housing. This portion also includes an inlet 16 to which a pipe 17 is connected.

As shown in Figs. 9 and 12 the portion 15 has a transverse partition 18 therein which separates the inlet 16 from the outlet 14 and includes a horizontal portion 19 having an aperture 20 therein. The upper portion of the aperture 20 includes a beveled portion to form a valve seat 21 which is adapted to be engaged by a valve member 22.

Above the central portion 15 I provide a pair of cylinder units 23 and 24 and below the central portion I provide a pair of cylinder units 25 and 26. Transverse partitions 27 separate the interior of the central portion 15 from the interior of the cylinder portions 23 and 25 and similar portions 28 separate the interiors of the cylinder portions 24 and 26 from the interiors of the adjacent cylinder portions. The lower end of the cylinder portion 26 is closed by a bottom member 29 and the upper end of the cylinder portion 24 is closed by a cap member 30. Each of the partitions 27 and 28 have a central aperture 31 therein in which a suitable packing gland 32 is provided. The various parts are removably held together as by bolts 32'.

The valve member 22 has a central aperture 33 therein in which a rod 34 is positioned. The rod 34 extends upward through the packing glands 32 to within the cap 30 and downward through the packing glands 32 to adjacent the bottom member 29. Adjacent the upper end the rod 34 includes a reduced threaded portion 35 thereon which is engaged by a nut 36 and adjacent to the lower end of the rod includes a similar reduced threaded portion 37 which is engaged by a nut 38.

Mounted on the rod 34 within each of the cylinder units 23, 24, 25, and 26 I provide a piston member 39 which includes a suitable packing material 40 clamped between a pair of discs 41. Surrounding the rod 34 between each of the pistons I provide spacer sleeves 42.

Adjacent the top of the valve member 22 the rod includes an enlarged shoulder 43 which engages the upper surface of the valve member. Between the shoulder 43 and the piston thereabove I provide a spacer sleeve 44 and between the lower face of the valve member 22 and the piston therebelow I provide a spacer sleeve 45. Between the upper piston and the nut 36 I provide a spacer sleeve 46. Thus when the valve member 22, pistons 39, spacer sleeves 42, 44, 45, and 46 and the nuts 36 and 38 are properly assembled on the rod 34 they all move as a unit.

The cap 30 includes a body portion 47 having a tapered aperture 48 therein the outer end of which communicates with an enlarged threaded aperture 49 which communicates with an enlarged aperture 50 which in turn communicates with a larger threaded aperture 51. The opposite or inner end of the tapered aperture 48 communicates with a reduced recess 52. Positioned in the tapered recess 48 I provide a tapered plug valve 53 which includes a reduced hub portion 54 and a further reduced stem portion 55 having a threaded portion 56 on the outer end thereof.

Within the aperture 49 I provide a suitable packing material 57 surrounding the hub 54 and which is retained in positioned by threaded washer plates 58. The stem 55 is mounted in an anti-friction bearing member 59 which is positioned in the aperture 50 and retained in position by a threaded plug member 60 positioned in the threaded aperture 51 and by a sleeve member 61 surrounding the stem. Mounted on the threaded portion 56 of the stem I provide an operating arm 62.

The central portion 15, the cylinder portions 23, 24, 25 and 26, the bottom plate 29 and the cap 30 all include a conduit portion 63 in the walls thereof having three conduits 64, 65, and 66 therein.

The lower end of the conduit 64 opens into the interior of the central portion 15 above the partition 18 as at 67 (see Fig. 9). The upper end of the conduit 64 opens into the tapered aperture 48 as at 68.

The upper end of the conduit 65 opens into the tapered aperture 48 as at 69 (see Figs. 9 and 11). The lower end of the conduit 65 is closed and lateral conduits 70 extend therefrom and open into each of the cylinder portions below the pistons therein. The upper end of the conduit 66 opens into the recess 52 as at 71 while the lower end thereof is closed and lateral conduits 72 extend therefrom and open into each of the cylinder portions above the pistons therein.

Above the aperture 48 the cap body 30 has an exhaust conduit 73 therein one end of which opens into the tapered aperture 48 as at 74 and the opposite end opens to the atmosphere.

The tapered plug valve 53 has a central axial conduit 75 therein having a pair of branch conduits 76 and 77 disposed at an angle of 120° to each other and extending outward therefrom to the face of the valve as shown in Figs. 7 and 8. The conduits 76 and 77 are, in various positions of the valve, adapted to register with the exhaust conduit 73 (see Figs. 7 and 8). Furthermore the conduit 75 has a pair of branch conduits 78 opening thereinto and through the surface of the valve which when the conduits 76 or 77 register with the exhaust conduit 73 register with the conduit 65. Below the conduit 75 the valve 53 has a pair of spaced conduits 79 therein each of which opens through the inner end of the valve into the recess 52 and adjacent the opposite end has a branch conduit 80 opening thereinto and through the surface of the valve.

When one of the other of the conduits 78 registers with the conduit 65 the one or the other of the conduits 80 is adapted to register with the conduit 64 (see Fig. 4). Below the conduit 75 and spaced between the conduits 79 the valve 53 has a conduit 81 therein from which spaced branch conduits 82 and 83 extend outward through the surface of the valve (see Fig. 3). In one position of the valve 53 the conduit 82 is adapted to register with the conduit 64 and at the same time the conduit 82 is adapted to register with the conduit 65.

Above the central conduit 75 and in line with the conduit 81 the plug valve 53 includes an exhaust conduit 84 having a branch conduit 85 opening thereinto and through the surface of the valve. When the branch conduits 82 and 83 register with the conduits 64 and 65 the branch conduit 85 registers with the exhaust conduit 73.

In operation fluid under pressure enters the central portion 15 of the device through the inlet 16 and flows into the conduit 64. When the plug valve 53 is in the position shown in Figs. 3 and 9 the fluid under pressure flows from the conduit 64 through the branch conduit of the plug valve into the conduit 81 and thence out through the conduit 83 into the conduit 65 from which it flows through the lateral conduits 70 into the cylinder portions below the pistons therein thus forcing the pistons to move upwardly thereby moving the valve member 22 out of engagement with its associated seat 21 whereupon the fluid flows from the inlet 16 to the outlet 14. The fluid in the cylinder portions above the pistons is forced out of the cylinders through the lateral conduits 72 into the conduit 66 and thence into the recess 52 from which it flows through the plug valve conduit 84 and branch conduit 85 into the exhaust conduit 73 and thence to the atmosphere.

When the plug valve 53 is in the position shown in Fig. 4 the fluid under pressure flows from the conduit 64 through the branch conduit 80 and the conduit 79 of the plug valve into the recess 52 and thence through the conduit 66 and through the lateral conduits 72 into the cylinder members above the pistons therein thereby forcing the pistons downward and thereby moving the valve member 22 into engagement with its associated seat 21 to restrict the flow of fluid from the inlet 16 to the outlet 14. The fluid in the cylinders below the pistons is forced out of the cylinders through the lateral conduits 70 into the conduit 65 and thence through one or the other of the branch conduits 78 into the conduit 75 of the plug valve whence it flows out through the branch conduit 77 into the exhaust conduit 73.

In Fig. 1 I have shown my device 10 as operatively installed in a main water supply line. In this installation a pump or pumps (not shown) force water through the pipes 17, 13, and 12 into a storage tank 11 and the water is also drawn out of the tank 11 through the same pipes. In Fig. 1 I have shown one end of an operating lever 62 operatively connected as at 86 to one end of a rod 87 the opposite end of which is secured to a piston 88 which is positioned in a closed top cylinder 89. The portion of the operating lever 62 on the opposite side of the valve stem has an adjustable counter-weight member 90 thereon.

A pipe line shown as a vertical pipe 91 and a horizontal pipe 91' extends from the cylinder 89 above the piston to the pipe 17 and has a check valve 92 interposed therein which allows the flow of fluid in the direction indicated by the arrow thereon but restricts the flow of fluid in the opposite direction. Furthermore a pipe line 93 extends from the cylinder 89 above the piston to the pipe 12 and has a check valve 94 therein which allows the flow of fluid in the direction indicated by the arrow thereon but restricts flow therethrough in the opposite direction. The pipe 93 is shown as of less diameter than the pipe 91.

In this installation I provide an automatic valve device which is indicated at 95 and shown in detail in Fig. 2. As shown the device 95 includes a closed cylinder 96 having a transverse partition 97 therein and which has an aperture 98 therein. Below the partition 97 the cylinder has an inlet opening 99 therein and above the partition the cylinder has an outlet opening 100 therein. A pipe 101 at one end communicates with the inlet 99 of the device and at the opposite end communicates with the pipe 91 intermediate the check valve 92 and the pipe 17. A pipe 102 at one end communicates with the outlet of the device and at the opposite end communicates with the pipe 91 intermediate the check valve 92 and the cylinder 89.

The aperture 98 is adapted to be closed by a valve member 103 which is mounted on a rod 104 on which a piston 105 is provided. Mounted on the rod 104 above the piston 105 I provide a plurality of removable weight members 106.

When the tank 11 is empty or when there is no pressure in the pipe 17 the counter weight 90 swings the operating lever 62 to a position whereing it moves the plug valve 53 of the device 10 to the position shown in Fig. 8 wherein unrestricted passageway is formed from below the pistons 39 to the atmosphere and an unrestricted passageway is formed from above the valve member 22 to above the pistons 39 as previously described. Thereafter when fluid under pressure is forced through the pipe 17, the device 10 being in a closed position, the fluid flows through the pipe 91 and the pipe 101 into the cylinder 96, below the valve 103 and when sufficient pressure is built up in the cylinder to overcome the weight of the valve and its associated parts the fluid forces the valve 103 upward and then flows out of the cylinder 96 and through the pipe 102 into the pipe 91 and thence into the cylinder 89.

As the check valve 94 restricts the flow of fluid through the pipe 93 the fluid builds up pressure in the cylinder 89 and moves the piston 88 and the rod 87 downward thereby swinging the operating arm 62 to a position wherein the plug valve 53 of the device 10 is moved to the position shown in Fig. 6 wherein unrestricted passageway is formed from above the pistons 39 to the atmosphere and an unrestricted passageway is formed from below the pistons to the center portion 15 above the valve member 22 as previously described whereupon the fluid pressure from the pipe 17 forces the pistons 39 upward thereby moving the valve 22 out of engagement with the valve seat 21, thereby allowing unrestricted flow from the pipe 17 through the device 10 and through the pipes 13 and 12 into the tank 11. Pressure in the pipe 91 is thus relieved whereupon the weights 106 force the valve 103 of the device 95 downward to close the aperture 98.

When the tank 11 contains a sufficient head of water which together with the weights 106 of the device 95 overcomes the pressure from the pipe 17 the valve 103 is forced downward to close the aperture 98 and at the same time the piston 88 is moved further downward to swing the operating lever to a position wherein the plug valve 53 is moved to the position shown in Fig. 7 wherein an unrestricted passageway is formed from below the pistons 39 to the atmosphere and an unrestricted passageway is formed from above the pistons 39 to the central portion 15 above the valve 22 whereupon the fluid pressure forces the pistons downward to move the valve 22 into engagement with the valve seat 21 to restrict the flow of fluid through the device 10 as previously described.

Having thus described my invention I claim:

1. In an automatic valve device, a housing having a central chamber therein, an inlet opening into said chamber and an outlet from said chamber, means in said chamber to control the passageway from said inlet to said outlet, said means including a valve member, said housing having a plurality of cylinders therein on each side of said chamber, each of said cylinders having a piston member therein, means connecting all of said pistons and said valve member, means to admit fluid from said chamber selectively to each side of said pistons and means to bleed said cylinders.

2. In an automatic valve device, a housing having a central chamber therein, an inlet opening into said chamber and an outlet from said chamber, means in said chamber to control the passageway from said inlet to said outlet, said means including a valve member, said housing having a plurality of cylinders therein on each side of said chamber, each of said cylinders having a piston member therein, means connecting all of said pistons and said valve member, said housing having a plug valve recess therein, a plug valve in said recess, said housing having a conduit communicating with said central chamber and said plug valve recess, said housing having a second conduit communicating with said plug valve recess and with each of said cylinders below said pistons therein, said housing having a third conduit communicating with said plug valve recess and each of said cylinders above said pistons therein, and means whereby said plug valve controls passage through said conduits.

3. In an automatic valve device, a housing having a central chamber therein, an inlet opening into said chamber and an outlet from said chamber, means in said chamber to control the passageway from said inlet to said outlet, said means including a valve member, said housing having a plurality of cylinders therein on each side of said chamber, each of said cylinders having a piston member therein, means connecting all of said pistons and said valve member, said housing having a recess therein, said housing including a conduit communicating with said central chamber and said recess, said housing including a second conduit communicating with said recess and with each of said cylinders at one side of said pistons, said housing having an exhaust conduit therein communicating with said recess and the atmosphere, means to afford passageway from said first conduit to said second conduit whereby fluid pressure in said central chamber forces said pistons to move said valve member in one direction and means to move said valve member in a reverse direction.

4. In a valve device, a housing having a central chamber therein, an inlet opening into said chamber and an outlet from said chamber, means in said chamber to control the passageway from said inlet to said outlet, said means including a valve member, said housing having a plurality of cylinders therein on each side of said chamber, each of said cylinders having a piston member therein, means connecting all of said pistons and said valve member, said housing having a recess therein, said housing including a conduit communicating with said central chamber and said recess, said housing including a second conduit communicating with said recess and with each of said cylinders below said pistons therein, said housing including a third conduit communicating with said recess and each of said cylinders above said pistons therein, said housing having an exhaust conduit therein communicating with said recess and the atmosphere, means to afford passageway from said first conduit to said second conduit and at the same time afford passageway from said third conduit to said exhaust conduit whereby fluid pressure in said central chamber forces said pistons to move said valve member to an open position and means to afford passageway from said first conduit to said third conduit and at the same time to afford passageway from said second conduit to said exhaust conduit whereby fluid pressure in said central chamber forces said pistons to move said valve member to a closed position.

5. In an automatic valve device, a housing having a central chamber therein, an inlet opening into said chamber and an outlet from said chamber, means in said chamber to control the passageway from said inlet to said outlet, said means including a valve member, said housing having a plurality of cylinders therein on each side of said chamber, each of said cylinders having a piston member therein, means connecting all of said pistons and said valve member, said housing having a plug valve recess therein, a plug valve in said recess, said housing including a conduit communicating with said central chamber and said plug valve recess, said housing including a second conduit communicating with said plug valve recess and with each of said cylinders below said pistons therein, said housing including a third conduit communicating with said plug valve recess and each of said cylinders above said pistons therein, said housing having an exhaust conduit therein communicating with said plug valve recess and the atmosphere, said plug valve including means to afford passageway from said first conduit to said second conduit and at the same time afford passageway from said third conduit to said exhaust conduit whereby fluid pressure in said central chamber forces said pistons upward to move said valve member to an open position, means on said plug valve to afford passageway from said first conduit to said third conduit and at the same time to afford passageway from said second conduit to said exhaust conduit whereby fluid pressure in said central chamber forces said pistons downward to move said valve member to a closed position.

HARRY J. McCOMBS BURDICK.